(12) United States Patent
Sok et al.

(10) Patent No.: US 8,217,534 B2
(45) Date of Patent: Jul. 10, 2012

(54) POWER GENERATOR DISTRIBUTED INVERTER

(75) Inventors: Veasna Sok, Long Beach, CA (US);
Stephen George Pisklak, Hockessin, DE (US); Sunit Oliver, Newark, DE (US)

(73) Assignee: General Electric Company, Schenectady, NY (US)

( * ) Notice: Subject to any disclaimer, the term of this patent is extended or adjusted under 35 U.S.C. 154(b) by 135 days.

(21) Appl. No.: 12/468,984

(22) Filed: May 20, 2009

(65) Prior Publication Data

US 2010/0295377 A1 Nov. 25, 2010

(51) Int. Cl.
*H02J 1/00* (2006.01)
*H02J 3/00* (2006.01)

(52) U.S. Cl. ............ 307/82; 136/243; 136/244; 307/43; 307/86

(58) Field of Classification Search ...................... 307/82
See application file for complete search history.

(56) References Cited

U.S. PATENT DOCUMENTS

| | | | | |
|---|---|---|---|---|
| 5,327,071 A * | 7/1994 | Frederick et al. | ............ | 323/299 |
| 5,513,075 A * | 4/1996 | Capper et al. | ................. | 361/773 |
| 6,433,522 B1 * | 8/2002 | Siri | ............................... | 323/272 |
| 6,950,323 B2 | 9/2005 | Achleitner et al. | | |
| 7,324,361 B2 | 1/2008 | Siri | | |
| 2003/0111103 A1 * | 6/2003 | Bower et al. | ................... | 136/244 |
| 2005/0172995 A1 * | 8/2005 | Rohrig et al. | ................. | 136/243 |
| 2005/0226017 A1 * | 10/2005 | Kotsopoulos et al. | ........ | 363/125 |
| 2007/0103108 A1 * | 5/2007 | Capp et al. | ..................... | 320/101 |
| 2007/0247004 A1 * | 10/2007 | Tan et al. | ......................... | 307/66 |
| 2009/0014050 A1 * | 1/2009 | Haaf | ............................... | 136/244 |
| 2009/0236917 A1 * | 9/2009 | Bettenwort et al. | ............ | 307/82 |
| 2010/0288327 A1 * | 11/2010 | Lisi et al. | ....................... | 136/244 |

FOREIGN PATENT DOCUMENTS

JP 2004-55603 A * 2/2004

OTHER PUBLICATIONS

WO_2004006342_A1_I to Toyomura et al., Jan. 15, 2004.*
WO Pub 2007125867 to Morimoto, english translation, Nov. 8, 2007.*

* cited by examiner

*Primary Examiner* — Rexford Barnie
*Assistant Examiner* — Justen Fauth
(74) *Attorney, Agent, or Firm* — Hoffman Warnick LLC; Ernest G. Cusick

(57) ABSTRACT

A power generator configuration having a distributed inverter. A system is described that includes a plurality of solar modules coupled together in series to form a string; a plurality of combiner boxes, wherein each combiner box couples together a plurality of strings in parallel; and a plurality of DC-DC converters, wherein each DC-DC converter increases a direct current (DC) voltage output of an associated combiner box. Also provided are distributed maximum power point tracker (MPPT) controls that adjust for changing conditions at individual sets of strings.

10 Claims, 3 Drawing Sheets

POWER GENERATOR DISTRIBUTED INVERTER

BACKGROUND OF THE INVENTION

The invention relates generally to a distributed power generator system, and more particularly to a solar array configuration that utilizes a plurality of voltage boosters distributed throughout the array proximate associated strings of solar modules.

A solar (or photovoltaic) array is a linked collection of solar modules, which are in turn made of multiple interconnected solar cells. The cells convert solar energy into direct current (DC) electricity via the photovoltaic effect. Modules are linked together to form an array. The modules in a solar array are usually first connected in series to obtain the desired voltage, and then the individual strings are connected in parallel to allow the system to produce more current. At some point down the line, after all of the modules are coupled together in a single line, an inverter is utilized to convert the DC power produced by the modules into alternating current (AC).

FIG. 1 depicts a typical configuration of a solar array system 10. Solar array system 10 includes a solar array made up of a plurality of solar modules 12. The solar array system 10 includes a plurality of combiner boxes 14A, 14B, 14C, 14D that couple sets of strings 16 in parallel. Each combiner box typically also includes a set of fuses 17 for each series string of modules. As noted, the parallel connections increase the current on each associated output line 15A, 15B, 15C, 15D. A second stage combiner box 18 may likewise be utilized to further combine the lines into a single DC line 26. In many applications, the DC lines exiting the fused combiner boxes 16, 18 may be hundreds or thousands of meters in length in order to carry the current from the solar modules (often located over many acres) to a terminal point.

Located near the terminal point is an inverter assembly 20, 22 that receives the single DC line 26 and converts DC to AC, providing all necessary safety functions required for interconnection with AC switch gear 24. The inverter assembly 20, 22 includes two stages, a first stage 20 comprising a DC disconnect 28 and a DC-DC converter 30 and a second stage 22 comprising a isolating transformer 32 and an AC disconnect 34. The DC and AC disconnects 28, 34 are implemented as safety features. The first stage 20 utilizes the DC-DC converter 30 to boost the inputted array voltage on line 26 to supply a DC link voltage. The second stage 24 converts the DC link voltage to AC. In this case, the inverter assembly 20, 22 ties directly into existing AC switch gear 24. This is typically completed with a supply side tap located between the utility meter and the utility main. One of the drawbacks of this configuration in a large scale application is the amount of wire (typically copper) required to connect the combiner boxes 14A, 14B, 14C, 14D, 18 with the inverter assembly.

BRIEF DESCRIPTION OF THE INVENTION

A first aspect of the disclosure provides a distributed power generator system, comprising: a plurality of power generator modules coupled together in series to form a string; a plurality of combiner boxes, wherein each combiner box couples together a plurality of strings in parallel; and a plurality of DC-DC converters, wherein each DC-DC converter increases a direct current (DC) voltage output of an associated combiner box.

A second aspect of the disclosure provides a distributed power generator infrastructure, comprising: a plurality of modules arranged in a plurality of strings, wherein each string includes a subset of modules coupled together in series; a plurality of combiner boxes, wherein each combiner box couples together a set of strings in a parallel configuration and provides an output line, and wherein each combiner box provides a fuse for each string in the set; a plurality of DC-DC converters, wherein each DC converter is coupled to an output line of an associated combiner box in order to boost a voltage of the output line; and a plurality of maximum power point tracker (MPPT) controls, wherein each MPPT control is adjusts for a changing output at an associated combiner box.

A third aspect of the disclosure provides a system, comprising: means for obtaining direct current (DC) power from a plurality of power generating modules; means for forming strings by combining sets of the plurality of power generating modules in series; means for coupling sets of strings together in parallel at different locations in the solar array; means for boosting the DC voltage at an output line of each coupled set of strings; means for combining the outputs lines into a single DC line; and means for converting the single DC line into alternating current (AC).

DETAILED DESCRIPTION OF THE INVENTION

Figure 1:
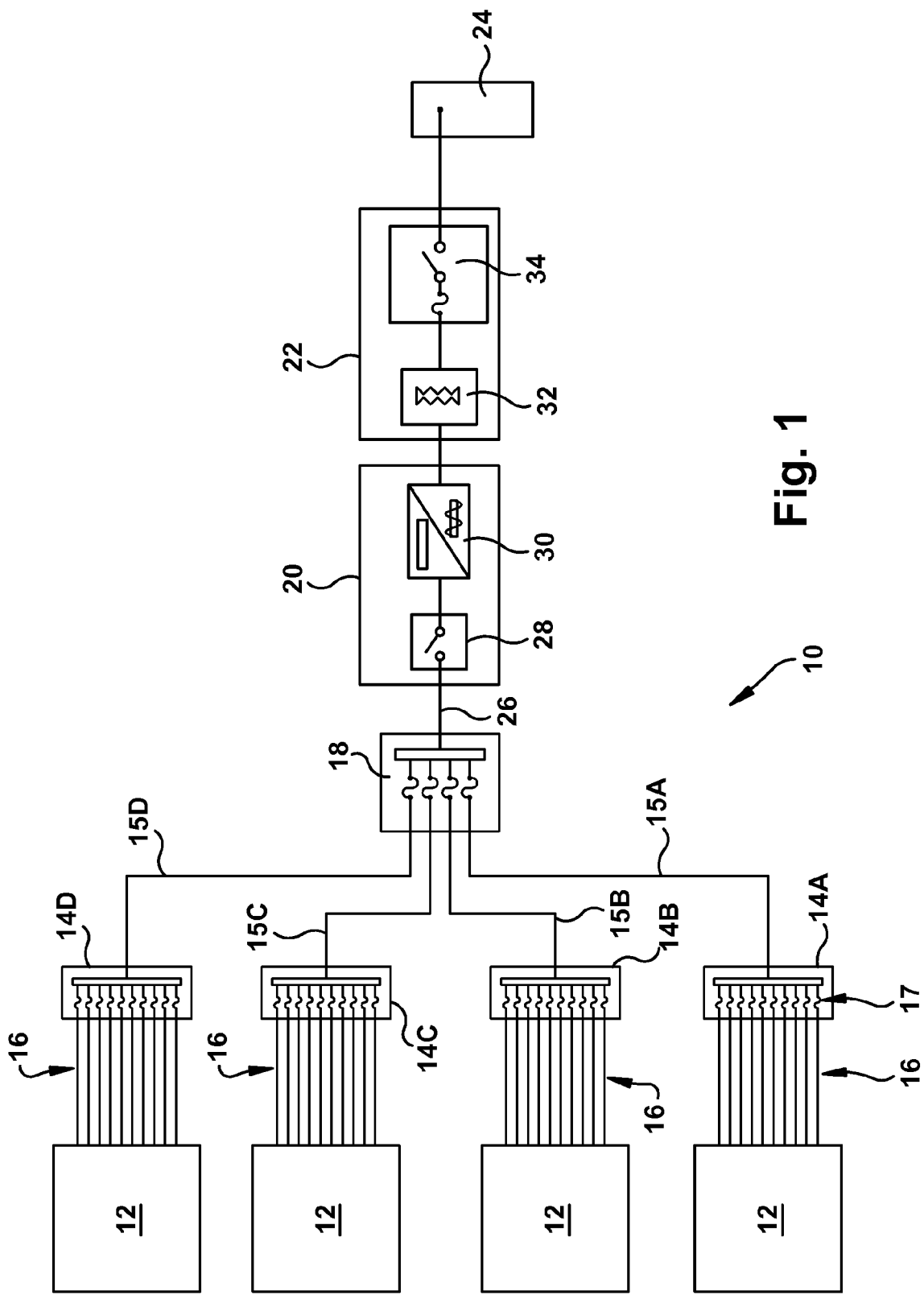
FIG. 1 shows an existing solar array system.
Figure 2:
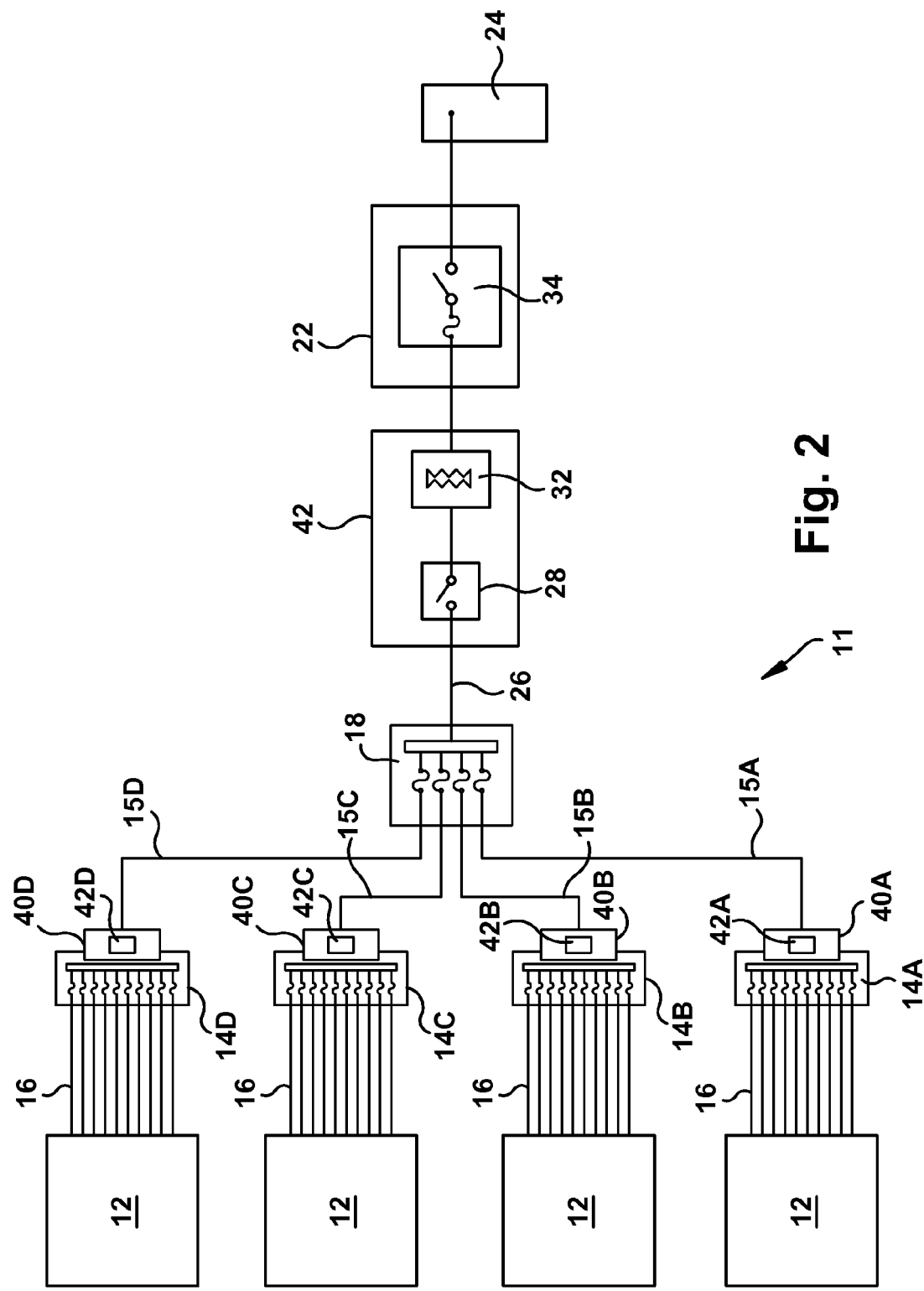
FIG. 2 shows a solar array system having a distributed inverter in accordance with an embodiment of the present invention.

FIG. 2 depicts a solar array system 11 that utilizes a distributed inverter configuration. In particular, the DC-DC converter circuitry has been removed from the inverter assembly (20, 22 of FIG. 1) and distributed to the combiner boxes 14A, 14B, 14C, 14D within the array. Accordingly, each combiner box, which connects a set of strings 16, has an associated DC-DC converter 40A, 40B, 40C, 40D that boosts the voltage output of the associated combiner box 14A, 14B, 14C, 14D. The booster voltage also results in a current drop. The DC-DC converters can be integrated into the combiner boxes or be implemented separately along the outputs 15A, 15B, 15C, 15D exiting each combiner box 14A, 14B, 14C, 14D. For the purposes of this disclosure, the term "combiner box" refers to any type of circuitry or harness for connecting strings of array modules. In addition, although described herein for use with a solar array system 11, the distributed inverter configuration could be utilized with any other distributed power generator having a DC electrical output, such as a distributed wind generator.

As can be seen, the first stage 42 of the inverter assembly (42, 22) in FIG. 2 no longer provides a DC-DC converter, but instead only includes a DC disconnect 28. Instead, as noted, the single DC-DC converter has been replaced with a plurality of DC-DC converters 40A, 40B, 40C, 40D, distributed throughout the array. In this embodiment, a DC-DC converter is associated with each coupled set of strings 16. By boosting the voltage outputs at the combiner boxes 14A, 14B, 14C, 14D prior to the inverter assembly (42, 22), various advantages are gained. One such advantage is that the higher voltage has less loss thereby allowing smaller gauge wires to be used between the combiner boxes 14A, 14B, 14C, 14D and inverter assembly (42, 22). Given the run lengths in a large array application and cost of copper, significant savings can be realized. In a typical system, each combiner box/DC-DC converter is located proximate the associated solar module, e.g., less than 10 meters. Conversely, the run length from the combiner box/DC-DC converter to the inverter assembly (42, 22) can be, e.g., hundreds of meters. Higher voltages along the longer run lengths mean less current and loss, thus allowing for a lower gauge wire to be used.

In addition, maximum power point tracker (MPPT) controls 42A, 42B, 42C, 42D can also be implemented in a distributed manner with the DC-DC converters 40A, 40B, 40C, 40D at the combiner boxes 14A, 14B, 14C, 14D to provide much more precise control. A maximum power point tracker (or MPPT) is utilized to provide an optimal electrical load for a power generator module, such as a photovoltaic (PV) cell or wind turbine. MPPT converts the power to a voltage or current level which is more suitable to whatever load the system is designed to drive. By locating MPPT controls 42A, 42B, 42C, 42D at the combiner boxes, adjustments at a much more granular level can be provided to account for changing outputs of discrete sets of strings in the solar array. Thus, for example, the impact of a passing cloud over a section of the array will only affect a small portion of the entire array.

Figure 3:
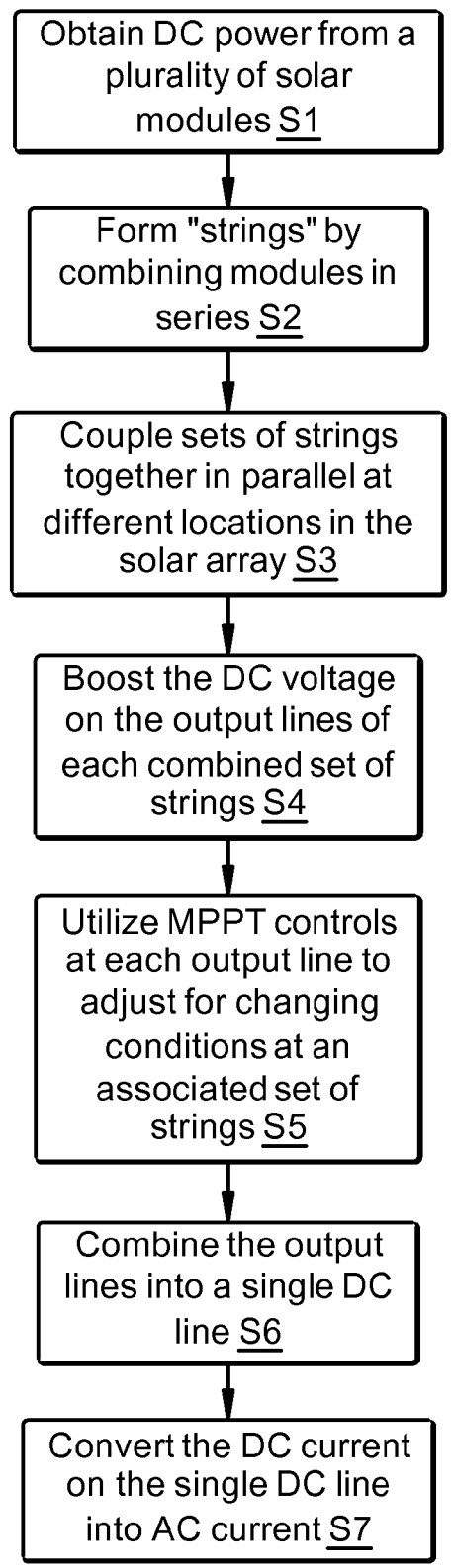
FIG. 3 depicts a flow diagram showing a method of implementing a solar array in accordance with an embodiment of the present invention.

FIG. 3 depicts a flow diagram showing an illustrative method of the present invention. At S1, DC power is obtained from a plurality of solar modules and at S2 strings are formed by combining modules in series. Next, sets of strings are coupled together in parallel at different locations in the solar array at S3, and the DC voltage on the output line of each coupling is boosted at S4. This increase in voltage results in a decrease in current. At S5, MPPT controls are utilized at each output line to adjust for changing conditions at an associated set of strings. Next, at S6, the output lines from each coupled set of strings are combined into a single DC line, and at S7, the single DC line is converted from DC to AC.

The terms "first," "second," and the like, herein do not denote any order, quantity, or importance, but rather are used to distinguish one element from another, and the terms "a" and "an" herein do not denote a limitation of quantity, but rather denote the presence of at least one of the referenced item. The modifier "about" used in connection with a quantity is inclusive of the stated value and has the meaning dictated by the context, (e.g., includes the degree of error associated with measurement of the particular quantity). The suffix "(s)" as used herein is intended to include both the singular and the plural of the term that it modifies, thereby including one or more of that term (e.g., the metal(s) includes one or more metals). Ranges disclosed herein are inclusive and independently combinable (e.g., ranges of "up to about 25 wt %, or, more specifically, about 5 wt % to about 20 wt %", is inclusive of the endpoints and all intermediate values of the ranges of "about 5 wt % to about 25 wt %," etc).

While various embodiments are described herein, it will be appreciated from the specification that various combinations of elements, variations or improvements therein may be made by those skilled in the art, and are within the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims

What is claimed is:

1. A distributed power generator system, comprising:
   a plurality of strings,
   wherein each string in the plurality of strings includes a plurality of power generator modules coupled together in series;
   a plurality of combiner boxes coupled to the plurality of strings, wherein each combiner box couples together a set of the strings in parallel;
   a plurality of DC-DC converters coupled to the plurality of combiner boxes,
   wherein each DC-DC converter is associated with a combiner box in the plurality of combiner boxes and increases a direct current (DC) voltage output of the associated combiner box;
   a plurality of maximum power point tracker (MPPT) controls coupled to the plurality of DC-DC converters,
   wherein each of the plurality of MPPT controls is coupled to a single associated DC-DC converter in the plurality of DC-DC converters and is configured to adjust an output of an associated combiner box in the plurality of combiner boxes based on a condition of the plurality of power generator modules coupled to the associated combiner box; and
   a second stage combiner box for coupling outputs of the plurality of combiner boxes into a single DC output, the second stage combiner box including an integrated DC-DC converter.

2. The distributed power generator system of claim 1, wherein each DC-DC converter in the plurality of DC-DC converters is coupled to an output line of an associated combiner box in the plurality of combiner boxes.

3. The distributed power generator system of claim 1, further comprising an inverter assembly for converting the single DC output into an AC output.

4. The distributed power generator system of claim 1, wherein each DC-DC converter is located proximate an output of the associated combiner box.

5. The distributed power generator system of claim 1, wherein each DC-DC converter is integrated into the associated combiner box.

6. The distributed power generator system of claim 1, wherein the plurality of power generator modules are selected from a group consisting of solar arrays and wind turbines.

7. A distributed power generator infrastructure, comprising:
   a plurality of modules arranged in a plurality of strings,
   wherein each string includes a subset of modules coupled together in series;
   a plurality of combiner boxes coupled to the plurality of strings,
   wherein each combiner box couples together a distinct set of the strings in a parallel configuration and provides an output line, and wherein each combiner box provides a fuse for each string in the set;
   a plurality of DC-DC converters coupled to the plurality of combiner boxes,
   wherein each DC-DC converter is coupled to an output line of an associated combiner box in order to boost a voltage of the associated output line;
   a plurality of maximum power point tracker (MPPT) controls coupled to the plurality of DC-DC converters,
   wherein each of the plurality of MPPT controls is coupled to a single associated DC-DC converter in the plurality of DC-DC converters and is configured to adjust an output of an associated combiner box in the plurality of combiner boxes based on a condition of the plurality of modules coupled to the associated combiner box;

a secondary combiner for combining a plurality of output lines into a single direct current line, the secondary combiner including an integrated DC-DC converter; and an inverter for converting the single direct current line from direct current to alternating current.

8. The distributed power generator infrastructure of claim 7, wherein each DC-DC converter in the plurality of DC-DC converters is integrated into an associated combiner box.

9. The distributed power generator infrastructure of claim 7, wherein each DC-DC converter is placed along the output line of an associated combiner box.

10. The distributed power generator infrastructure of claim 7, wherein the plurality of modules are selected from a group consisting of solar arrays and wind turbines.

* * * * *